United States Patent
Liu

(10) Patent No.: US 11,316,800 B2
(45) Date of Patent: Apr. 26, 2022

(54) METHOD AND SYSTEM FOR MANAGING APPLICATIONS

(71) Applicant: WANGSU SCIENCE & TECHNOLOGY CO., LTD., Shanghai (CN)

(72) Inventor: Chenxing Liu, Shanghai (CN)

(73) Assignee: WANGSU SCIENCE & TECHNOLOGY CO., LTD., Shanghai (CN)

( * ) Notice: Subject to any disclaimer, the term of this patent is extended or adjusted under 35 U.S.C. 154(b) by 0 days.

(21) Appl. No.: 17/043,204

(22) PCT Filed: Dec. 5, 2018

(86) PCT No.: PCT/CN2018/119360
§ 371 (c)(1),
(2) Date: Sep. 29, 2020

(87) PCT Pub. No.: WO2020/077763
PCT Pub. Date: Apr. 23, 2020

(65) Prior Publication Data
US 2021/0058338 A1 Feb. 25, 2021

(30) Foreign Application Priority Data
Oct. 17, 2018 (CN) .......................... 201811210356.2

(51) Int. Cl.
*H04L 12/911* (2013.01)
*G06F 8/65* (2018.01)
(Continued)

(52) U.S. Cl.
CPC ................ *H04L 47/82* (2013.01); *G06F 8/63* (2013.01); *G06F 8/65* (2013.01); *H04L 41/0803* (2013.01);
(Continued)

(58) Field of Classification Search
CPC ....... H04L 41/08–0846; H04L 41/0876–0893; H04L 41/5041–5054; H04L 67/34; G06F 8/60–65
See application file for complete search history.

(56) References Cited

U.S. PATENT DOCUMENTS 9,177,489 B2    11/2015    Driessen
9,355,248 B1    5/2016    Wiest et al.
(Continued)

FOREIGN PATENT DOCUMENTS

CN    102377598 A    3/2012
CN    103944769 A    7/2014
(Continued)

OTHER PUBLICATIONS

H. Chang, A. Hari, S. Mukherjee and T. V. Lakshman, "Bringing the cloud to the edge," 2014 IEEE Conference on Computer Communications Workshops (INFOCOM WKSHPS), 2014, pp. 346-351.*
(Continued)

*Primary Examiner* — Brendan Y Higa

(57) ABSTRACT

A method and a system for managing applications are provided. Further, the method includes: deploying an application container engine in an edge node; receiving, by the edge node, application deployment information sent by a central node; according to the application deployment information, downloading, by the edge node, an image containing a corresponding application from the central node; calling, by the edge node, the application container engine to load the image, and running, by the edge node, the application in the application container engine; and allocating, by the edge node, available resources for the application container engine.

20 Claims, 2 Drawing Sheets

(51) Int. Cl.
  *H04L 29/08* (2006.01)
  *H04L 12/24* (2006.01)
  *G06F 8/61* (2018.01)
  *H04L 47/70* (2022.01)
  *H04L 67/60* (2022.01)
  *H04L 67/00* (2022.01)
  *H04L 41/0803* (2022.01)
  *H04L 41/0893* (2022.01)
  *H04L 41/5054* (2022.01)

(52) U.S. Cl.
  CPC ...... *H04L 41/0893* (2013.01); *H04L 41/5054* (2013.01); *H04L 67/32* (2013.01); *H04L 67/34* (2013.01)

(56) References Cited

U.S. PATENT DOCUMENTS

| | | | |
|---|---|---|---|
| 9,451,043 | B2 | 9/2016 | Zhao et al. |
| 9,811,806 | B1* | 11/2017 | Kuang ............... G06F 16/128 |
| 10,761,911 | B2* | 9/2020 | Gupta ................. G06F 9/455 |
| 10,887,198 | B2* | 1/2021 | Giust ................ H04L 41/5054 |
| 10,922,090 | B1* | 2/2021 | Lieberman ............. G06F 8/60 |
| 2007/0168919 | A1* | 7/2007 | Henseler ................ G06F 8/61 717/101 |
| 2016/0048384 | A1* | 2/2016 | Fan ..................... G06F 8/65 717/171 |
| 2017/0251368 | A1* | 8/2017 | Ross ................... H04W 12/03 |
| 2017/0366616 | A1* | 12/2017 | Rodrigues Nascimento ............... H04W 4/44 |
| 2017/0373940 | A1 | 12/2017 | Shahab et al. |
| 2018/0115522 | A1* | 4/2018 | Gleichauf ............. G06F 21/53 |
| 2018/0173502 | A1* | 6/2018 | Biskup ................. G06F 8/71 |
| 2018/0173570 | A1* | 6/2018 | Chintalapally ....... G06F 9/5044 |
| 2018/0234351 | A1* | 8/2018 | Amento ................ G06F 9/00 |
| 2018/0310150 | A1* | 10/2018 | Cuevas Ramirez .... H04W 4/60 |
| 2019/0123959 | A1* | 4/2019 | Joshi ................. G05B 23/0289 |
| 2019/0199830 | A1* | 6/2019 | Cannon ................ G06F 8/60 |
| 2019/0347121 | A1* | 11/2019 | Luo ................... G06F 3/0644 |
| 2020/0301685 | A1* | 9/2020 | Verma ................. G06F 8/60 |
| 2020/0356387 | A1* | 11/2020 | Anwar ............... G06F 9/44578 |
| 2021/0058338 | A1* | 2/2021 | Liu .................. H04L 47/82 |
| 2021/0203554 | A1* | 7/2021 | Peng .................. H04L 67/34 |

FOREIGN PATENT DOCUMENTS

| | | |
|---|---|---|
| CN | 104579793 A | 4/2015 |
| CN | 105468362 A | 4/2016 |
| CN | 105867955 A | 8/2016 |
| CN | 106445473 A | 2/2017 |
| CN | 106506587 A | 3/2017 |
| CN | 106789250 A | 3/2017 |
| CN | 106790483 A | 5/2017 |
| CN | 107105029 A | 8/2017 |
| CN | 107229520 A | 10/2017 |
| CN | 107256178 A | 10/2017 |
| CN | 107426274 A | 12/2017 |
| CN | 107688322 A | 2/2018 |
| CN | 107733977 A | 2/2018 |
| CN | 107769949 A | 3/2018 |
| CN | 108052333 A | 5/2018 |
| CN | 108399094 A | 8/2018 |

OTHER PUBLICATIONS

B. I. Ismail et al., "Evaluation of Docker as Edge computing platform," 2015 IEEE Conference on Open Systems (ICOS), 2015, pp. 130-135.*
K. Liu, A. Gurudutt, T. Kamaal, C. Divakara and P. Prabhakaran, "Edge computing framework for distributed smart applications," 2017, pp. 1-8.*
A. Ahmed and G. Pierre, "Docker Container Deployment in Fog Computing Infrastructures," 2018 IEEE International Conference on Edge Computing (EDGE), Jul. 2, 2018, pp. 1-8.*
The World Intellectual Property Organization (WIPO) International Search Report for PCT/CN2018/119360 dated Jun. 27, 2019 6 pages.
The China National Intelleectual Property Administration (CNIPA) The China Search Report for 201811210356.2 dated Mar. 3, 2020 5 Pages.
The China National Intelleectual Property Administration (CNIPA) The China Search Report for 201811210356.2 dated Sep. 7, 2020 5 Pages.
Anonymous:"Kuberetes—Wikipedia", Jan. 28, 2018 (Jan. 28, 2018), XP055486775, Retrieved from the Internet: URL:https://en.wikipedia.org/w/index.php?title=Kubernetes&oldid=822862688 [retrieved on Jun. 21, 2018].
Lertsinsrubtavee Adisorn et al: "PiCasso: A lightweight edge computing platform", 2017 IEEE 6th International Conference on Cloud Networking ( CLOUDNET ), IEEE,Sep. 25, 2017 ( Sep. 25, 2017), pp. 1-7,XP033230714, DOI: 10.1109/CLOUDNET.2017.8071529 [Retrieved on Oct. 18, 2017].
Christian Melendez: "A Detailed Guide to Canary Deployments", May 21, 2018 ( May 21, 2018 ), pp. 1-12,XP055635923, Retrieved from the Internet: URL:https://dzone.com/articles/a-detailed-guide-to-canary-deployments [retrieved on Oct. 25, 2019].
Anonymous:"Manage compute resources container—Unofficial Kubernetes", Jul. 27, 2018(Jul. 27, 2018), pp. 1-8,XP55851352, Retrieved from the Internet:URL:https://web.archive.org/web/20180727224854/https://unofficial-kubernetes.readthedocs.io/en/latest/concepts/configuration/manage-compute-resources-container/ [retrieved on Oct. 14, 2021].
Etienne Tremel: "Kubernetes deployment strategies", Sep. 25, 2017 (Sep. 25, 2017), pp. 1-20,XP55851357, Retrieved from the Internet: URL:https://blog.container-solutions.com/kubernetes-deployment-strategies#kubernetes-canary [retrieved on Oct. 14, 2021].

* cited by examiner

METHOD AND SYSTEM FOR MANAGING APPLICATIONS

CROSS-REFERENCES TO RELATED APPLICATIONS

This application is a national phase entry under 35 U.S.C § 371 of International Application No. PCT/CN2018/119360, filed on Dec. 5, 2018, which claims priority of Chinese Patent Application No. 201811210356.2, filed with the State Intellectual Property Office of P. R. China on Oct. 17, 2018, the entire contents of all of which are incorporated herein by reference.

FIELD OF THE DISCLOSURE

The present disclosure generally relates to the field of computer application technology and, more particularly, relates to a method and system for managing applications.

BACKGROUND

With the rapid development of Internet and applications thereof, most companies have established their own websites. To improve the response speed and efficiency of visiting the websites, CDN (Content Delivery Network) technology can be adopted. The technical principle of CDN is to set up server nodes across the network and publish web content to an edge server node (hereinafter referred to as "edge node") at the edge of the network. Therefore, user can obtain the pre-accessed content from the edge node closest to the user, which reduces network congestion and improves the response speed of the network.

Currently, a plurality of applications can be deployed on every edge node. Management of edge node includes two methods, one is not to perform virtualization, and the other is to perform virtualization at an operating system level. When the edge node is not virtualized, because all applications are installed on one operating system, the applications compete for server resources, which affects the externally provided services when the load is high. Further, server resources cannot be scheduled, and resources occupied by certain applications may be wasted or insufficient. When the operating system level is virtualized, the server desires to be restarted while switching services or scheduling resources, thus external services are affected.

BRIEF SUMMARY OF THE DISCLOSURE

To solve the issues of the prior art, the disclosed embodiments of the present invention provide a method and system for managing applications. The technical solutions include the following.

One aspect of the present disclosure includes a method for managing applications. The method comprises:
 deploying an application container engine in an edge node;
 receiving, by the edge node, application deployment information sent by a central node;
 according to the application deployment information, downloading, by the edge node, an image containing a corresponding application from the central node;
 calling, by the edge node, the application container engine to load the image, and running, by the edge node, the application in the application container engine; and
 allocating, by the edge node, available resources for the application container engine.

Optionally, before receiving, by the edge node, the application deployment information sent by the central node, the method includes:
 receiving, by the central node, the image containing the application sent by a client;
 receiving, by the central node, an application deployment request sent by the client, wherein the application deployment request includes a range of edge nodes containing applications to be deployed; and
 according to the application deployment request, sending, by the central node, the application deployment information to the edge node.

Optionally, the application deployment request includes deployment batches and a range of edge nodes corresponding to every batch; and
 according to the application deployment request, sending, by the central node, the application deployment information to the edge node includes:
  according to the application deployment request, sending, by the central node, the application deployment information to a first batch of edge nodes,
  after completing application deployment according to the application deployment information, sending, by a current batch of edge nodes, an application deployment result and application running status to the central node, and
  after determining that the application deployment of the current batch of edge nodes meets the requirements according to the application deployment result and the application running status, and the current batch of edge nodes is not the last batch, sending, by the central node, the application deployment information to a following batch of edge nodes, and repeatedly performing this step, otherwise, ending the step.

Optionally, the application deployment information includes resource information, where the resource information includes size of various resources allocated for the application; and
 correspondingly, allocating, by the edge node, the available resources for the application container engine includes:
  according to the resource information, allocating, by the edge node, the available resources for the application container engine.

Optionally, the application deployment information includes an application identifier; and
 correspondingly, according to the application deployment information, downloading, by the edge node, the image containing the corresponding application from the central node includes:
  according to the application deployment information, downloading, by the edge node, an image corresponding to the application identifier from the central node.

Optionally, calling, by the edge node, the application container engine to load the image includes:
 according to a preset call strategy, calling, by the edge node, an idle application container engine to load the image.

Optionally, the method further includes:
 sending, by the edge node, resource usage of the application container engine to the central node at a fixed period;
 receiving, by the central node, current resource usage of the application container engine, and determining, by the central node, whether the current resource usage of the application container engine meets the requirements;

if not, generating, by the central node, resource adjustment information, and sending, by the central node, the resource adjustment information to the edge node; and receiving, by the edge node, the resource adjustment information, and according to the resource adjustment information, re-allocating, by the edge node, available resources for the application container engine.

Optionally, after determining, by the central node, that the current resource usage of the application container engine does not meet the requirements, the method further includes:

sending, by the central node, the current resource usage of the application container engine to the client;

according to the resource usage, generating, by the client, indication information about whether to perform resource adjustment;

sending, by the client, the indication information to the central node; and receiving, by the central node, the indication information, and if the indication information indicates that the resource adjustment desires to be performed, generating, by the central node, the resource adjustment information.

Optionally, the method further includes:

receiving, by the central node, an application upgrade request sent by the client, wherein the application upgrade request includes a range of edge nodes to be upgraded;

according to the application upgrade request, determining, by the central node, a grayscale upgrading strategy, wherein the grayscale upgrading strategy includes grayscale batches and a range of edge nodes corresponding to every batch; and according to the grayscale upgrading strategy, sending, by the central node, application upgrade information to the edge nodes in batches.

Optionally, after according to the grayscale upgrading strategy, sending, by the central node, the application upgrade information to every batch of edge nodes, the method further includes:

receiving, by the current batch of edge nodes, the application upgrade information sent by the central node, and upgrading, by the current batch of edge nodes, the application; and after the application upgrade completes, sending, by the current batch of edge nodes, a grayscale result to the central node, wherein the grayscale result includes an upgrade result and service status information of the application container engine.

Optionally, according to the grayscale upgrading strategy, sending, by the central node, the application upgrade information to the edge nodes in batches includes:

according to the grayscale upgrading strategy, sending, by the central node, the application upgrade information to a first batch of edge nodes;

receiving, by the central node, the grayscale result sent by the current batch of edge nodes, if the grayscale result meets the requirements, sending, by the central node, the application upgrade information to a following batch of edge nodes after a preset period, and repeatedly performing this step until application upgrade of total batches of edge nodes completes; and if the grayscale result does not meet the requirements, sending, by the central node, rollback information to the current batch of edge nodes to enable the current batch of edge nodes to roll back the application to the pre-upgraded application version.

Optionally, receiving, by the current batch of edge nodes, the application upgrade information sent by the central node, and upgrading, by the current batch of edge nodes, the application include:

receiving, by the edge node, the application upgrade information sent by the central node;

according to the application upgrade information, upgrading, by the edge node, the application using a new application container engine; and if the application upgrade succeeds, releasing, by the edge node, the pre-upgraded available resources allocated for the original application container engine.

Optionally, the central node is configured to perform a dynamic lifecycle management on the application, wherein the dynamic lifecycle management includes a start operation, a stop operation, and a restart operation.

Another aspect of the present disclosure includes a system for managing applications, comprising edge nodes and a central node;

an edge node is configured to deploy an application container engine in the node; receive application deployment information sent by the central node; according to the application deployment information, download an image containing a corresponding application from the central node; call the application container engine to load the image, and run the application in the application container engine; and allocate available resources for the application container engine; and the central node is configured to send application deployment information to the edge node.

Optionally, the central node is further configured to:

receive the image containing the application and sent by a client;

receive the application deployment request sent by the client, wherein the application deployment request includes a range of edge nodes containing applications to be deployed;

according to the application deployment request, generate application deployment information; and send the application deployment information to the edge node.

Optionally, the application deployment request includes deployment batches and a range of edge nodes corresponding to every batch;

according to the application deployment request, the central node is configured to send the application deployment information to a first batch of edge nodes;

after completing application deployment according to the application deployment information, the edge node is configured to send an application deployment result and application running status to the central node; and after determining that the application deployment of the current batch of edge nodes meets the requirements according to the application deployment result and the application running status, and the current batch of edge nodes is not the last batch, the central node is configured to send the application deployment information to a following batch of edge nodes.

Optionally, the application deployment information includes resource information, wherein the resource information includes size of various resources allocated for the application; and according to the resource information, the edge node is configured to allocate available resources for the application container engine.

Optionally, the edge node is configured to send resource usage of the application container engine to the central node at a fixed period;

the central node is configured to receive current resource usage of the application container engine, determine whether the current resource usage of the application container engine meets the requirements, if not, generate resource adjustment information, and send the resource adjustment information to the edge node; and the edge node is configured to receive the resource adjustment information, and according to the resource adjustment information, re-allocate available resources for the application container engine.

Optionally, the central node is configured to send the current resource usage of the application container engine to the client;

the client is configured to generate indication information about whether to perform resource adjustment according to the resource usage, and send the indication information to the central node; and the central node is configured to receive the indication information, and if the indication information indicates that the resource adjustment desires to be performed, generate the resource adjustment information.

Optionally, the central node is configured to:

receive an application upgrade request sent by a client, wherein the application upgrade request includes a range of edge nodes to be upgraded;

according to the application upgrade request, determine a grayscale upgrading strategy, wherein the grayscale upgrading strategy includes grayscale batches and a range of edge nodes corresponding to every batch; and according to the grayscale upgrading strategy, send application upgrade information to the edge nodes in batches.

Optionally, the edge node is configured to:

receive the application upgrade information sent by the central node, and upgrade the application; and after the application upgrade completes, send a grayscale result to the central node, wherein the grayscale result includes an upgrade result and service status information of the application container engine.

Optionally, the central node is configured to:

according to the grayscale upgrading strategy, send the application upgrade information to a first batch of edge nodes;

receive the grayscale result sent by the current batch of edge nodes, if the grayscale result meets the requirements, send the application upgrade information to a following batch of edge nodes after a preset period, and repeatedly perform this step until application upgrade of total batches of edge nodes completes; and if the grayscale result does not meet the requirements, send rollback information to the current batch of edge nodes to enable the current batch of edge nodes to roll back the application to the pre-upgraded application version.

Optionally, the edge node is configured to:

receive the application upgrade information sent by the central node;

according to the application upgrade information, upgrade the application using a new application container engine; and if the application upgrade succeeds, release the pre-upgraded available resources allocated for the original application container engine.

In the disclosed embodiments of the present invention, an application may be deployed in an application container engine, and the applications may not interfere with each other to achieve resource isolation and to avoid resource competition between applications. Moreover, because the applications do not interfere with each other, the occurrence of faults may be reduced, and the application may be substantially reliable. Further, the available resources of the application container engine may be reasonably allocated to avoid uneven resource utilization and to minimize allocated resources while ensuring normal operation of the application, thereby improving resource utilization and saving costs. In addition, when allocating resources, the required resources may be accelerated to allocate for edge computing and the system, thereby improving system service quality. At the same time, because the application deployment is performed in the application container engine, grayscale and smooth upgrade may be achieved, and resource adjustment may be arbitrarily performed on the application without interrupting the service.

BRIEF DESCRIPTION OF THE DRAWINGS

To more clearly illustrate the technical solutions in the disclosed embodiments of the present invention, drawings to be used in the description of the embodiments will be briefly described below. It is obvious that the drawings in the following description are certain embodiments of the present invention, and other drawings may be obtained by a person of ordinary skill in the art in view of the drawings provided without creative efforts.

DETAILED DESCRIPTION

For clearer understanding of the technical characteristics, aims and effects of the present invention, specific embodiments of the present invention are now described in detail with reference to the accompanying drawings.

Figure 1:
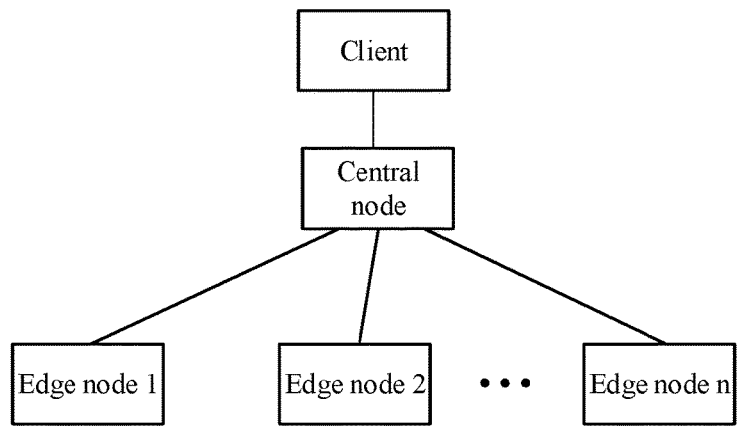
FIG. 1 illustrates a schematic diagram of a network framework consistent with an embodiment of the present invention.

The disclosed embodiments of the present invention provide a method for managing applications. The method may be applied to a network framework illustrated in FIG. 1. The network framework may include clients, central nodes, and edge nodes. To run their own websites and provide network services for users, enterprises may deploy applications on a plurality of edge nodes through client control. The detailed deployment process may be described as follows. The client may package the application into an image, send the image to the central node, and send an application deployment request to the central node. The application deployment request may include a range of edge nodes containing applications to be deployed. The central node may then send application deployment information to a corresponding edge node according to the application deployment request, such that the edge node may download the image containing the corresponding application according to the application deployment information, and may load the image by using an application container engine to perform application deployment. After the application is deployed in the edge node, the user may access the edge node to obtain a corresponding service, e.g., browsing a blog, watching a video, etc. The application container engine in the disclosed embodiment may employ a docker container.

The application deployment request sent by the client may further include deployment batches and a range of edge nodes corresponding to every batch. In other words, according to the application deployment request, the central node may perform application deployment on the total edge nodes containing applications to be deployed in batches. The detailed process of the central node performing application deployment on the edge nodes in batches may include the following. The central node may send the application deployment information to a first batch of edge nodes according to the application deployment request. After the applications in current batch of edge nodes are deployed, an application deployment result and application running status may be sent to the central node. After determining that the application deployment of the current batch of edge nodes meets the requirements according to the application deployment result and the application running status, and the current batch of edge nodes is not the last batch, the central node may send the application deployment information to a following batch of edge nodes, this step may be repeatedly performed. Otherwise, the step may be ended. An issue that after performing a one-time large-scale deployment, problems occur when running the application, which requires another large-scale deployment, may be prevented. Such issue may cause a great deal of waste of manpower and time, and a waste of edge server resources.

Optionally, the application deployment request sent by the client may not include the deployment batches and the range of edge nodes corresponding to every batch. The central node may determine the deployment batch and the range of edge nodes corresponding to every batch according to the range of edge nodes containing applications to be deployed in the application deployment request.

The method for managing applications, including application deployment, application resource adjustment, and application upgrades, is described in details below.

Figure 2:
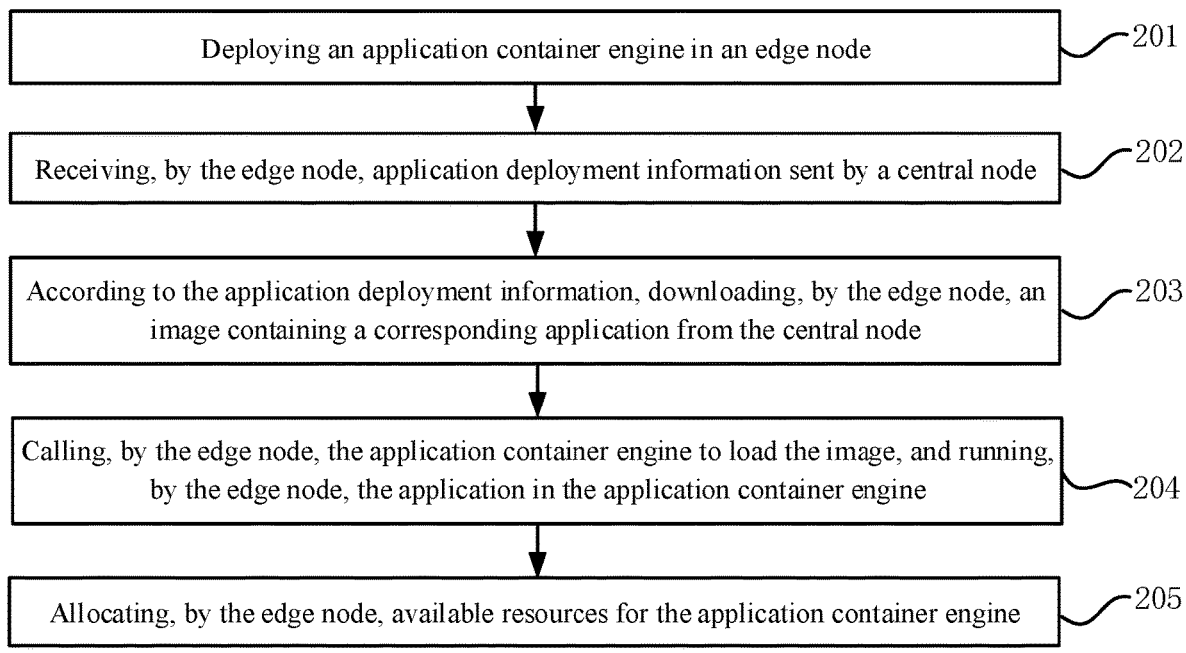
FIG. 2 illustrates a flowchart of a method for managing applications consistent with an embodiment of the present invention.

FIG. 2 illustrates a flowchart of a method for managing applications consistent with an embodiment of the present invention. Further, the process of an application deployment in an edge node is mainly described in detail. The process may include the following steps in detail.

Step 201: The edge node may be deployed with application container engines in the node.

The edge node may be deployed with a preset number of application container engines in the node in advance. Because the application container engine uses the sandbox mechanism, there may be a system-level isolation between any two application container engines, and there may be no interface between them. Therefore, applications running in different application container engines may not interfere with each other.

Step 202: The edge node may receive the application deployment information sent by the central node.

The edge node may receive the application deployment information sent by the central node, and the application deployment information may include an application identifier of the application to be deployed.

Step 203: The edge node may download an image containing the corresponding application from the central node according to the application deployment information.

The central node may store a plurality of application images, i.e., images containing the applications, uploaded by the client. The edge node may download the image corresponding to the application identifier from the central node according to the application identifier in the application deployment information, to prepare for subsequent application deployment. In one embodiment, the image download function may be achieved based on the P2P technology.

Optionally, the application images uploaded by the client may be stored in another image library. The storage location of the application images is not limited in the disclosed embodiments of the present invention.

Step 204: The edge node may call an application container engine to load the image and run the application in the application container engine.

The edge node may randomly call an idle application container engine or may call an idle application container engine according to a preset call strategy, to load the image. In one embodiment, the image may be loaded into an application container engine by calling an interface of the application container engine. After loading the image, the application container engine may be launched to run the application in the application container engine.

In one embodiment, the central node may also be responsible for the static configuration management of the application, and may mainly manage the configuration file required for the application deployment. When deploying applications, the edge node may download the corresponding configuration file in the central node to perform the application configuration.

Step 205: The edge node may allocate available resources to the application container engine.

Every application may run in a different application container engine. The applications may run independently and may not affect each other. Therefore, after allocating available resources to the application container engine, resource competition issue may not occur between the application container engines. In one embodiment, the edge node may allocate corresponding available resources for each application according to a preset resource allocation strategy, and the available resources may include memory, CPU, disk, bandwidth, etc. Optionally, the application deployment request sent by the client to the central node may further include resource information, and the resource information may include size of various resources allocated for the application. Thus, the application deployment information generated by the central node may also include the resource information. After sending the application deployment information to the edge node, the edge node may allocate resources according to the resource information.

In one embodiment, the central node may also be responsible for the dynamic lifecycle management of an application, e.g., operations such as start, stop, restart and the like, of the application. During the dynamic lifecycle management process of the application, the central node may send corresponding instructions to the edge node to control the edge node to perform corresponding operations on the application.

In one embodiment, the central node may also be responsible for monitoring the operation status of the edge node. In other words, the edge node may send the status data to the central node at a fixed period, such that the central node may detect the operation status of the edge node according to the status data. The central node may also send machine information of an edge node, e.g., machine identifier, machine type, etc., to the edge node, such that the edge node may learn machine information thereof, thereby facilitating communication with other devices.

In the disclosed embodiments of the present invention, an application may be deployed in an application container engine, and the applications may not interfere with each other to achieve resource isolation and to avoid resource competition between applications. Moreover, because the applications do not interfere with each other, the occurrence of faults may be reduced, and the application may be substantially reliable. Further, the available resources of the application container engine may be reasonably allocated to avoid uneven resource utilization and to minimize allocated resources while ensuring normal operation of the application, thereby improving resource utilization and saving costs. In addition, when allocating resources, the required resources may be allocated for edge computing and system acceleration, thereby improving system service quality. At the same time, because the application deployment is performed in the application container engine, grayscale and smooth upgrade may be achieved, and resource adjustment may be arbitrarily performed on the application without interrupting the service.

The process of application deployment is mainly described in detail above. The process of application resource adjustment is described in detail below with reference to FIG. 3.

Figure 3:
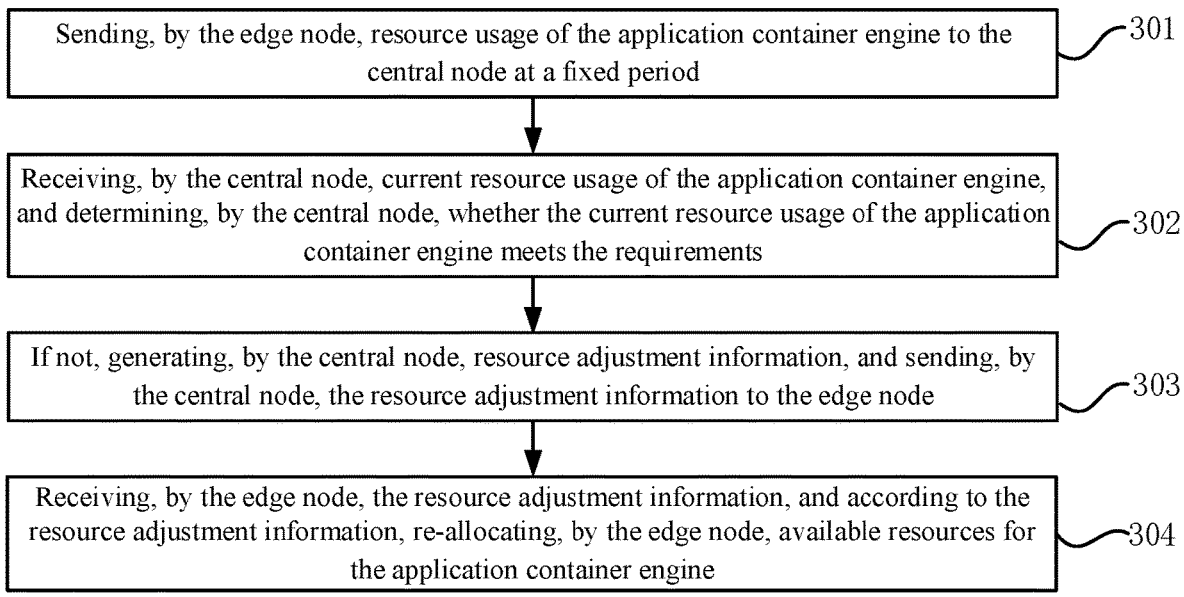
FIG. 3 illustrates a flowchart of another method for managing applications consistent with an embodiment of the present invention.

FIG. 3 illustrates a flowchart of another method for managing applications consistent with an embodiment of the present invention. The process of application resource adjustment is mainly described in detail, and the process may include the following steps in detail.

Step 301: The edge node may send the resource usage of the application container engine to the central node at a fixed period.

After completing the application deployment, the edge node may monitor the resource usage of the application container engine in real time, or may monitor the resource usage of the application in the application container engine. Optionally, the edge node may also monitor the resource utilization of the application container engine, i.e., a ratio of the currently used resources over the allocated available resources.

Step 302: The central node may determine whether the current resource usage of the application container engine meets the requirements.

The central node may determine whether the available resources currently allocated for the application are wasted or insufficient according to the resource usage uploaded by the edge node. For example, when the resource utilization is lower than a preset ratio, it may be determined that there is a waste of available resources currently allocated for the application.

Step 303: After determining that the current resource usage does not meet the requirements, the central node may generate resource adjustment information, and may send the resource adjustment information to the edge node.

After determining that the current resource usage does not meet the requirements, the central node may reallocate the resource information for the application according to the current resource usage and a preset resource allocation strategy, and may generate the resource adjustment information. The resource adjustment information may include re-allocated resource information.

Optionally, the process of generating, by the central node, the resource adjustment information may further include the following. The central node may send the current resource usage of the application container engine to the client. The client may receive the resource usage, and according to the resource usage, may generate indication information about whether to perform resource adjustment. The client may send the indication information to the central node. The central node may receive the indication information, and may generate the resource adjustment information when the indication information indicates that resource adjustment is required.

The central node may send the current resource usage of the application to the client, such that the client may determine whether to perform resource adjustment according to the resource usage and development trend of the service. Therefore, the decision of whether performing the resource adjustment may be substantially suitable for the development trend of the service. If the client determines that the resource adjustment needs to be performed, the generated indication information may include the re-allocated resource information. After sending the indication information to the central node, the resource adjustment information generated by the central node may also include the re-allocated resource information.

Step 304: The edge node may receive the resource adjustment information, and may reallocate available resources for the application container engine according to the resource adjustment information.

After receiving the resource adjustment information sent by the central node, the edge node may reallocate the available resources to the application container engine according to the resource information in the resource adjustment information.

In the disclosed embodiments of the present invention, the resource usage of every application container engine may be monitored in real time. When there is an unreasonable resource usage, the resources may be reasonably re-allocated to avoid uneven resource utilization. In a case where normal operation of application is ensured, allocated resources may be reduced to a greatest extent, thereby improving resource utilization and saving costs. In addition, when allocating resources, required resources for edge computing and system acceleration may be allocated, thereby improving system service quality. Further, because the application deployment is performed in the application container engine, resource adjustment may be arbitrarily performed on the application without interrupting the service, thereby further improving system service quality.

Figure 4:
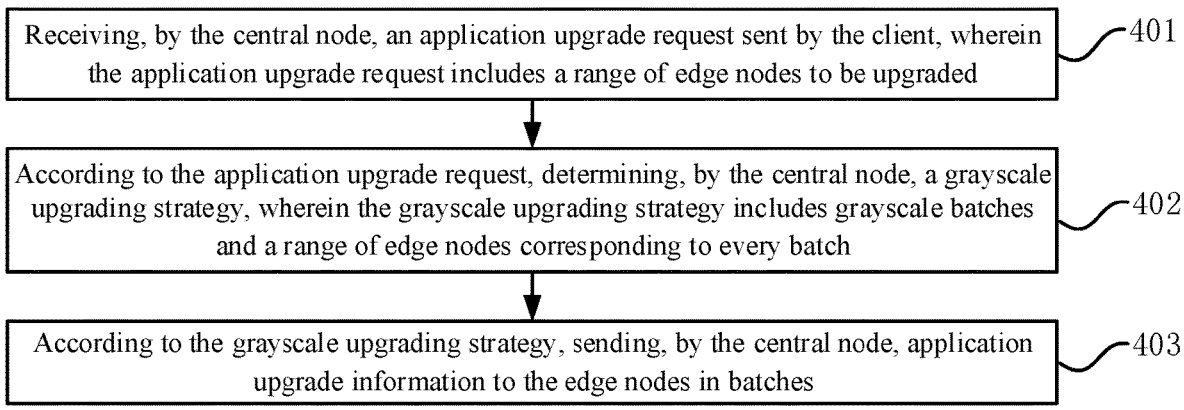
FIG. 4 illustrates a flowchart of another method for managing applications consistent with an embodiment of the present invention.

FIG. 4 illustrates a flowchart of another method for managing applications consistent with an embodiment of the present invention. The process of application upgrade is mainly described in detail, and the process may include the following steps in detail.

Step 401: The central node may receive an application upgrade request sent by the client, where the application upgrade request may include a range of edge nodes to be upgraded.

Before the client sends the application upgrade request to the central node, an image containing an upgraded application may be uploaded to the central node, such that the edge node containing application to be upgraded may obtain the image, and may utilize the image to perform the application upgrade.

Step 402: The central node may determine a grayscale upgrading strategy according to the application upgrade request, where the grayscale upgrading strategy may include grayscale batches and a range of edge nodes corresponding to every batch.

In the disclosed embodiments, the grayscale upgrading mode may be adopted, and the grayscale upgrading may be a local upgrading. When certain servers desire to be upgraded, a part of the certain servers may be upgraded and tested, and after ensuring that the program is correct, other servers may be upgraded, to reduce the consequences of bugs of the upgraded program to the greatest extent. In one embodiment, the central node may determine the grayscale upgrading strategy according to the range of the edge nodes to be upgraded. In another embodiment, the application upgrade request sent by the client to the central node may include the grayscale upgrading strategy, thereby the grayscale upgrading strategy may be directly obtained from the application upgrade request. The grayscale upgrading strategy may be used to specify that the edge nodes to be upgraded are upgraded in several batches. For example, the first batch of edge nodes numbered 1-10 may be first upgraded, the second batch of edge nodes numbered 11-20 may be then upgraded, and last, the third batch of edge nodes numbered 21-30 may be upgraded. Thus, the 30 edge nodes may be upgraded in three batches.

Step 403: The central node may send application upgrade information to the edge nodes in batches according to the grayscale upgrading strategy.

The application upgrade request may include an application identifier of an application to be upgraded, such that the edge node may determine the application to be upgraded according to the application identifier.

In one embodiment, the specific process of the central node upgrading the edge nodes in batches according to the grayscale upgrading strategy may include the following. The central node may send the application upgrade information to the first batch of edge nodes according to the grayscale upgrading strategy. The current batch of edge nodes may receive the application upgrade information sent by the central node, and may upgrade the application. After the application upgrade of the current batch of edge nodes completes, a grayscale result may be sent to the central node, where the grayscale result may include an upgrade result and service status information of the application container engine. The central node may receive the grayscale result sent by the current batch of edge nodes, and if the grayscale result meets the requirements, may send the application upgrade information to a following batch of edge nodes after a preset period. This step may be repeatedly performed until the application upgrade of total batches of edge nodes completes. If the grayscale result does not meet the requirements, rollback information may be sent to the current batch of edge nodes, such that the current batch of edge nodes may roll back the application to the pre-upgraded application version. Hereinafter, every step in the process may be described in detail.

After the edge node receives the application upgrade information sent by the central node, the application may be upgraded. An edge node in the current batch is used as an example for illustrative purposes, the step of performing the application upgrade on the edge node may include the following. The edge node may receive application upgrade information sent by the central node. The edge node may utilize a new application container engine to upgrade the application according to the application upgrade information. If the application upgrade succeeds, the edge node may release the pre-upgraded available resources allocated for the original application container engine. Further, the process of upgrading the application using the new application container engine may include: downloading the image containing an upgraded application from the central node, calling the new application container engine to load the image, and then allocating available resources for the new application container engine. The process may also be a deployment for the upgraded application, and may be similar to the process of the application deployment described above. The detailed steps may refer to the disclosed embodiments associated with FIG. 2, which are not described herein again.

In the process of upgrading the application using the new application container engine, if the application upgrade fails, i.e., the deployment of the upgraded application fails, the edge node may continue to use the original application to serve the user. Optionally, if the application upgrade succeeds, the original application may be deleted after the upgraded application runs for a period and determining that the operation is normal, to ensure that the original application may be quickly switched to provide services for the user after the upgraded application is found to have problems.

In the process of utilizing the new application container engine for application upgrade, the pre-upgraded application may still run normally in the original application container engine and may provide services for the user. After the application in the new application container engine is successfully upgraded and runs normally, the original application may be deleted. Therefore, the service may not be suspended, and the application may be smoothly upgraded.

The edge node may send the grayscale result to the central node after the application upgrade completes. The grayscale result may include the upgrade result and the service status information of the application container engine. The service status information of the application container engine may include the resource usage. If the current resource usage is significantly different from the pre-upgraded resource usage, the service status of the application container engine may not meet the requirements. When the upgrade result indicates that the application upgrade succeeds and the service status of the application container engine meets the requirements, the grayscale result of the edge node may be normal.

The central node may receive the grayscale result sent by the current batch of edge nodes. If the grayscale result meets the requirements, the central node may send the application upgrade information to a following batch of edge nodes after a preset period. In one embodiment, the central node may store a judgment strategy for judging whether the grayscale result meets the requirements in advance. For example, when a ratio of the edge nodes whose grayscale result is normal in the current batch of edge nodes is greater than a preset ratio, it may be determined that the grayscale result sent by the current batch of edge nodes meets the requirements, and the application upgrade information may be sent to a following batch of edge nodes.

If the grayscale result sent by the current batch of edge nodes does not meet the requirements, the central node may send rollback information to the current batch of edge nodes, such that the edge node may roll back the upgraded application to the pre-upgraded application version. In other words, resources for the original application may be reallocated, and the original application may be enabled to provide services for the user.

In the disclosed embodiments of the present invention, the grayscale upgrading mode may be used to upgrade applications in batches. First, a small quantity of edge nodes may be used to perform an upgrade test. After the test succeeds, the upgrade on a following batch may be performed to ensure that the upgrade is correct. Even if the upgrade has problems, the influence range may be controlled very soon.

Based on a same technical concept as the foregoing disclosed embodiments, the disclosed embodiments of the present invention further provide a system for managing applications. The system may include edge nodes and a central node.

Further, the edge node may be configured to deploy an application container engine in the node; receive application deployment information sent by the central node; download an image containing the corresponding application from the central node according to the application deployment information; call the application container engine to load the image; run the application in the application container engine; and allocate available resources for the application container engine.

The central node may be configured to send the application deployment information to the edge node.

Optionally, the central node may be further configured to:
receive an image containing the application and sent by the client;
receive the application deployment request sent by the client, where the application deployment request may include a range of edge nodes containing applications to be deployed;
generate application deployment information according to the application deployment request; and
send the application deployment information to the edge node.

Optionally, the application deployment request may include deployment batches and a range of edge nodes corresponding to every batch.

The central node may be configured to send the application deployment information to the first batch of edge nodes according to the application deployment request.

The edge node may be configured to send an application deployment result and application running status to the central node after completing the application deployment according to the application deployment information.

After determining that the application deployment of the current batch of edge nodes meets the requirements according to the application deployment result and the application running status, and the current batch of edge nodes is not the last batch, the central node may be configured to send the application deployment information to a following batch of edge nodes.

Optionally, the application deployment information may include resource information. The resource information may include size of various resources allocated for the application.

The edge node may be configured to allocate available resources to the application container engine according to the resource information.

Optionally, the application deployment information may include an application identifier.

The edge node may be configured to download an image corresponding to the application identifier from the central node according to the application deployment information.

Optionally, the edge node may be configured to call an idle application container engine to load the image according to a preset call strategy.

Optionally, the edge node may be configured to send the resource usage of the application container engine to the central node at a fixed period.

The central node may be configured to receive the current resource usage of the application container engine, determine whether the current resource usage of the application container engine meets the requirements, if not, generate resource adjustment information, and send the resource adjustment information to the edge node.

The edge node may be configured to receive the resource adjustment information, and re-allocate available resources for the application container engine according to the resource adjustment information.

Optionally, the central node may be configured to send the current resource usage of the application container engine to the client, such that the client may generate indication information about whether to perform resource adjustment according to the resource usage, and may send the indication information to the central node.

The central node may be configured to receive the indication information, and if the indication information indicates that the resource adjustment desires to be performed, generate the resource adjustment information.

Optionally, the central node may be configured to:
receive an application upgrade request sent by the client, where the application upgrade request may include a range of edge nodes to be upgraded;
according to the application upgrade request, determine a grayscale upgrading strategy, where the grayscale upgrading strategy may include grayscale batches and a range of edge nodes corresponding to every batch; and
send the application upgrade information to the edge nodes in batches according to the grayscale upgrading strategy.

Optionally, the edge node may be configured to:
receive the application upgrade information sent by the central node, and upgrade the application; and
send a grayscale result to the central node after the application upgrade completes, where the grayscale result may include an upgrade result and service status information of the application container engine.

Optionally, the central node may be configured to:
send the application upgrade information to the first batch of edge nodes according to the grayscale upgrading strategy;
receive the grayscale result sent by the current batch of edge nodes, if the grayscale result meets the requirements, send the application upgrade information to a following batch of edge nodes after a preset period, and repeatedly perform the step until application upgrade of total batches of edge nodes completes; and
if the grayscale result does not meet the requirements, send rollback information to the current batch of edge nodes, such that the current batch of edge nodes may roll back the application to the pre-upgraded application version.

Optionally, the edge node may be configured to:
receive the application upgrade information sent by the central node;
upgrade the application using a new application container engine according to the application upgrade information; and
if the application upgrade succeeds, release the pre-upgraded available resources allocated for the original application container engine.

Optionally, the central node may be configured to perform dynamic lifecycle management on the application, where the dynamic lifecycle management may comprise a start operation, a stop operation, and a restart operation.

In the disclosed embodiments of the present invention, an application may be deployed in an application container engine, and the applications may not interfere with each other to achieve resource isolation and to avoid resource competition between applications. Moreover, because the applications do not interfere with each other, the occurrence of faults may be reduced, and the application may be substantially reliable. Further, the available resources of the application container engine may be reasonably allocated to avoid uneven resource utilization and to minimize allocated resources while ensuring normal operation of the application, thereby improving resource utilization and saving costs. In addition, when allocating resources, the required resources may be allocated for edge computing and system acceleration, thereby improving system service quality. At the same time, because the application deployment is performed in the application container engine, grayscale and smooth upgrade may be achieved, and resource adjustment may be arbitrarily performed on the application without interrupting the service.

It should be noted that the system for managing applications provided in the foregoing embodiments and the method for managing applications in the disclosed embodiments may belong to a same concept, and the detailed implementation process may be described in detail in the embodiments of management method, which is not described herein again.

A person skilled in the art can understand that all or part of the procedures implementing the above embodiments may be completed through a hardware, or may be completed by instructing a related hardware through a program. The program may be stored in a computer-readable storage medium. The storage medium mentioned above may be a read-only memory, a magnetic disk, or an optical disk, etc.

The above descriptions are merely the preferred embodiments of the present invention, and are not intended to limit the present invention. Any modifications, equivalents, improvements, etc., which are within the spirit and scope of the present invention, should be included in the protection of the present invention.

What is claimed is:

1. A method for managing applications, wherein the method comprises:
   deploying an application container engine in an edge node;
   receiving, by the edge node, application deployment information sent by a central node;
   according to the application deployment information, downloading, by the edge node, an image containing a corresponding application from the central node;
   calling, by the edge node, the application container engine to load the image, and running, by the edge node, the application in the application container engine; and
   allocating, by the edge node, available resources for the application container engine.

2. The method according to claim 1, wherein before receiving, by the edge node, the application deployment information sent by the central node, the method further including:
   receiving, by the central node, the image containing the application sent by a client;
   receiving, by the central node, an application deployment request sent by the client, wherein the application deployment request includes a range of edge nodes containing applications to be deployed; and
   according to the application deployment request, sending, by the central node, the application deployment information to the edge node.

3. The method according to claim 2, wherein:
   the application deployment request includes deployment batches and a range of edge nodes corresponding to every batch; and
   the method further including:
   according to the application deployment request, sending, by the central node, the application deployment information to a first batch of edge nodes included in the deployment batches,
   after completing application deployment according to the application deployment information, sending, by a current batch of edge nodes, an application deployment result and application running status to the central node, and
   after determining that the application deployment of the current batch of edge nodes meets requirements according to the application deployment result and the application running status, and the current batch of edge nodes is not the last batch included in the deployment batches of edge nodes, sending, by the central node, the application deployment information to a following batch included in the deployment batches of edge nodes, and repeatedly performing this step, wherein this step includes:
   completing the application deployment according to the application deployment information, sending, by the current batch of edge nodes, the application deployment result and application running status to the central node; and
   after determining that the application deployment of the current batch of edge nodes meets the requirements according to the application deployment result and the application running status, and the current batch of edge nodes is not the last batch, sending, by the central node, the application deployment information to the following batch of edge nodes, otherwise, ending the step.

4. The method according to claim 1, wherein:
   the application deployment information includes resource information, wherein the resource information includes size of various resources allocated for the application; and
   allocating, by the edge node, the available resources for the application container engine according to the resource information.

5. The method according to claim 1, wherein:
   the application deployment information includes an application identifier; and
   according to the application identifier, downloading, by the edge node, the image containing the corresponding application from the central node.

6. The method according to claim 1, wherein calling, by the edge node, the application container engine to load the image includes:
   according to a preset call strategy, calling, by the edge node, an idle application container engine to load the image.

7. The method according to claim 1, wherein the method further includes:
   sending, by the edge node, resource usage of the application container engine to the central node at a fixed period;
   receiving, by the central node, current resource usage of the application container engine, and determining, by the central node, whether the current resource usage of the application container engine meets requirements;

if not, generating, by the central node, resource adjustment information, and sending, by the central node, the resource adjustment information to the edge node; and receiving, by the edge node, the resource adjustment information, and according to the resource adjustment information, re-allocating, by the edge node, available resources for the application container engine.

8. The method according to claim 7, wherein after determining, by the central node, that the current resource usage of the application container engine does not meet the requirements, the method further including:

sending, by the central node, the current resource usage of the application container engine to a client;

according to the resource usage, generating, by the client, indication information about whether to perform resource adjustment;

sending, by the client, the indication information to the central node; and receiving, by the central node, the indication information, and if the indication information indicates that the client desires the resource adjustment to be performed, generating, by the central node, the resource adjustment information.

9. The method according to claim 1, wherein the method further includes:

receiving, by the central node, an application upgrade request sent by a client, wherein the application upgrade request includes a range of edge nodes to be upgraded;

according to the application upgrade request, determining, by the central node, a grayscale upgrading strategy, wherein the grayscale upgrading strategy includes grayscale batches and a range of edge nodes corresponding to every batch; and according to the grayscale upgrading strategy, sending, by the central node, application upgrade information to the edge nodes in batches.

10. The method according to claim 9, further including:

receiving, by a current batch of edge nodes, the application upgrade information sent by the central node, and upgrading, by the current batch of edge nodes, the application; and after the application upgrade completes, sending, by the current batch of edge nodes, a grayscale result to the central node, wherein the grayscale result includes an upgrade result and service status information of the application container engine.

11. The method according to claim 10, further including:

receiving, by the central node, the grayscale result sent by the current batch of edge nodes, if the grayscale result meets requirements, sending, by the central node, the application upgrade information to a following batch of edge nodes after a preset period, and repeatedly performing this step of sending, by the central node, the application upgrade information to the edge nodes in batches until application upgrade of total batches of edge nodes completes; and if the grayscale result does not meet the requirements, sending, by the central node, rollback information to the current batch of edge nodes to enable the current batch of edge nodes to roll back the application to a pre-upgraded application version.

12. The method according to claim 10, further including:

receiving, by the edge node, the application upgrade information sent by the central node;

according to the application upgrade information, upgrading, by the edge node, the application using a new application container engine; and if the application upgrade succeeds, releasing, by the edge node, pre-upgraded available resources allocated for the original application container engine.

13. The method according to claim 1, wherein:

the central node is configured to perform a dynamic lifecycle management on the application, wherein the dynamic lifecycle management includes a start operation, a stop operation, and a restart operation.

14. A system for managing applications, comprising:

edge nodes and a central node, wherein:

an edge node is configured to:

deploy an application container engine in the node, receive application deployment information sent by the central node, according to the application deployment information, download an image containing a corresponding application from the central node, call the application container engine to load the image, and run the application in the application container engine, and allocate available resources for the application container engine; and the central node is configured to send application deployment information to the edge node.

15. The system according to claim 14, wherein the central node is further configured to:

receive the image containing the application and sent by a client;

receive the application deployment request sent by the client, wherein the application deployment request includes a range of edge nodes containing applications to be deployed;

according to the application deployment request, generate application deployment information; and send the application deployment information to the edge node.

16. The system according to claim 15, wherein:

the application deployment request includes deployment batches and a range of edge nodes corresponding to every batch;

according to the application deployment request, the central node is configured to send the application deployment information to a first batch of edge nodes;

after completing application deployment according to the application deployment information, the edge node is configured to send an application deployment result and application running status to the central node; and after determining that the application deployment of the current batch of edge nodes meets requirements according to the application deployment result and the application running status, and the current batch of edge nodes is not the last batch, the central node is configured to send the application deployment information to a following batch of edge nodes.

17. The system according to claim 14, wherein:

the application deployment information includes resource information, wherein the resource information includes size of various resources allocated for the application; and according to the resource information, the edge node is configured to allocate available resources for the application container engine.

18. The system according to claim 14, wherein:
the edge node is configured to send resource usage of the application container engine to the central node at a fixed period;
the central node is configured to receive current resource usage of the application container engine, determine whether the current resource usage of the application container engine meets requirements, if not, generate resource adjustment information, and send the resource adjustment information to the edge node; and
the edge node is configured to receive the resource adjustment information, and according to the resource adjustment information, re-allocate available resources for the application container engine.

19. The system according to claim 18, wherein:
the central node is configured to send the current resource usage of the application container engine to a client, and to enable the client to generate indication information about whether to perform resource adjustment according to the resource usage, and to send the indication information to the central node; and
the central node is configured to receive the indication information, and if the indication information indicates that the client desires the resource adjustment to be performed, generate the resource adjustment information.

20. The system according to claim 14, wherein the central node is configured to:
receive an application upgrade request sent by a client, wherein the application upgrade request includes a range of edge nodes to be upgraded;
according to the application upgrade request, determine a grayscale upgrading strategy, wherein the grayscale upgrading strategy includes grayscale batches and a range of edge nodes corresponding to every batch; and
according to the grayscale upgrading strategy, send application upgrade information to the edge nodes in batches.

* * * * *